United States Patent
Yang et al.

(10) Patent No.: US 7,460,125 B2
(45) Date of Patent: Dec. 2, 2008

(54) APPARATUS AND METHOD FOR IMMEDIATELY CREATING AND CONTROLLING VIRTUAL REALITY INTERACTIVE HUMAN BODY MODEL FOR USER-CENTRIC INTERFACE

(75) Inventors: Ung Yeon Yang, Taejon (KR); Wookho Son, Taejon (KR)

(73) Assignee: Electronics and Telecommunications Research Institute, Taejeon (KR)

( * ) Notice: Subject to any disclaimer, the term of this patent is extended or adjusted under 35 U.S.C. 154(b) by 259 days.

(21) Appl. No.: 11/438,279

(22) Filed: May 23, 2006

(65) Prior Publication Data
US 2007/0126733 A1 Jun. 7, 2007

(30) Foreign Application Priority Data
Dec. 2, 2005 (KR) ...................... 10-2005-0116815

(51) Int. Cl.
*G06T 15/00* (2006.01)

(52) U.S. Cl. ........................ 345/473; 345/474; 345/475; 709/202

(58) Field of Classification Search ......... 345/473–475; 709/202
See application file for complete search history.

(56) References Cited

U.S. PATENT DOCUMENTS
7,185,047 B1 * 2/2007 Bate et al. .................... 709/202

FOREIGN PATENT DOCUMENTS
| KR | 1020000063919 | 11/2000 |
| KR | 1020010088701 | 9/2001 |
| KR | 1020020079268 | 10/2002 |

* cited by examiner

*Primary Examiner*—Phu K Nguyen
(74) *Attorney, Agent, or Firm*—Lowe Hauptman Ham & Berner, LLP

(57) ABSTRACT

Provided is an apparatus and method for immediately creating and controlling a virtual reality interactive human body model for a user-centric interface. The apparatus and method can transform a whole body three-dimensional (3D) default model into a model close to the body of a user by collecting data from the user's hands, generates a user coincident 3D model by selecting a skin texture map and applying it to the transformed model, and controlling the user coincident 3D model in a deformable polygon mesh structure to naturally visualize the motion of the user coincident 3D model. The apparatus and method can make users participate in a virtual reality system conveniently and work naturally in the same manner as reality, i.e., interaction. The apparatus and method provides ordinary users with an easy access to virtual reality systems and overcomes the shortcomings of existing virtual reality systems which simply provide visual effects.

16 Claims, 5 Drawing Sheets

APPARATUS AND METHOD FOR IMMEDIATELY CREATING AND CONTROLLING VIRTUAL REALITY INTERACTIVE HUMAN BODY MODEL FOR USER-CENTRIC INTERFACE

BACKGROUND OF THE INVENTION

1. Field of the Invention

The present invention relates to an apparatus and method for developing an interactive interface for a virtual reality system, and more particularly, to an apparatus and method for immediately creating and controlling a virtual reality interactive human body model for providing a user-centric interface which supports a user of a virtual reality system to acquire the same experience as reality.

2. Description of the Related Art

One of the major advantages of a virtual reality system is to provide users with virtual experience with a high degree of coincidence with reality. Conventional virtual reality systems include a virtual space simulated by a computer, a user of the real world, and an interface system that smoothly supports interaction between them.

Current industrial production systems are producing various kinds of goods in small quantities to satisfy shortening lifecycle of products and diverse demands of users.

In order to improve the efficiency of a product lifecycle system, which includes product development, planning, design, production, marketing and maintenance service after sales, production companies adopt computer systems such as Computer-Aided Design (CAD), digitalize a designing process, perform an integrated simultaneous designing, and link controllers of factory automation facilities with each other to thereby shorten the time from the planning of a product to the market. Computer systems adopted into the current production procedures, such as CAD, Computer Aided Manufacturing (CAM), and Computer Aided Engineering (CAE), and digitalizing data which used to be manually managed in the form of documents are developing into a computer simulation technology to increase the efficiency.

Current digital systems, however, remain in the level of simple interaction between visualization using a two-dimensional (2D) display device and a desktop computer. Therefore, it is hard to apply a scenario based on direct interaction between a user and an actual work environment.

SUMMARY OF THE INVENTION

Accordingly, the present invention is directed to a virtual reality interactive human body model creating apparatus and method, which substantially obviates one or more problems due to limitations and disadvantages of the related art.

It is an object of the present invention to provide an apparatus and method for immediately creating and controlling virtual reality interactive human body model for a user-centric interface. The apparatus and method can transform a whole body three-dimensional (3D) default model into a model close to the body of a user by collecting data from the user's hand, generates a user coincident 3D model by selecting a skin texture map and applying the skin texture map to the transformed model, and controlling the generated user coincident 3D model in a deformable polygon mesh structure to naturally visualize the motion of the user coincident 3D model. The apparatus and method can make the user directly participate in a virtual reality system quickly and conveniently and work naturally in the same method as reality, i.e., interaction.

Additional advantages, objects, and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

To achieve these objects and other advantages and in accordance with the purpose of the invention, as embodied and broadly described herein, there is provided an apparatus for immediately creating and controlling a virtual reality interactive human body model for a user-centric interface, which includes: a module for creating a whole body 3D default model of a user based on the gender and age values of the user and a database including body measurement data of grouped users; a module for acquiring body measurement data and skin texture map data from a hand image of the user which are acquired by an image acquisition device; a module for scaling measurements of body parts of the above-generated whole body default model to increase the degree of coincidence with the user by using an algorithm for predicting measurement values of major parts of the body based on the above-acquired hand measurement data; a skin texture map database for automatically applying a skin texture map to the 3D body model to increase the degree of coincidence with the user and a module for automatically or semi-automatically selecting a skin texture map that coincides with the skin texture map of the user; a deformable polygon mesh structure controlling module for naturally visualizing the above-generated motion of the user-centric 3D body model; a module for storing the above-generated user-centric 3D interactive model for re-use or for smooth integration with another system; and a user tracker linking and synchronizing module for linking and synchronizing user tracking data with a hardware interface for real-time interaction in a virtual reality system.

In another aspect of the present invention, there is provided a method for immediately creating and controlling a virtual reality interactive human body model for a user-centric interface, which includes the steps of: a) creating a whole body 3D default model in a whole body 3D default model creating unit based on the gender and age of a user and a body measurements database and acquiring hand measurement data and skin color data in a hand image acquiring unit from a hand image of the user which are acquired by an image acquisition device; b) predicting measurements of body parts in a user coincident body model transformation unit from the inputted hand measurement data and scaling the whole body 3D default model to thereby produce a user coincident 3D body model; c) applying a skin texture map to the user coincident 3D body model based on the skin color data of the user's hand in a skin texture map selection and application unit; and d) linking and synchronizing user tracking data with a hardware interface for real-time interaction.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention, are incorporated in and constitute a part of this application, illustrate embodiments of the invention and together with the description serve to explain the principle of the invention. In the drawings.

DETAILED DESCRIPTION OF THE INVENTION

Figure 1:
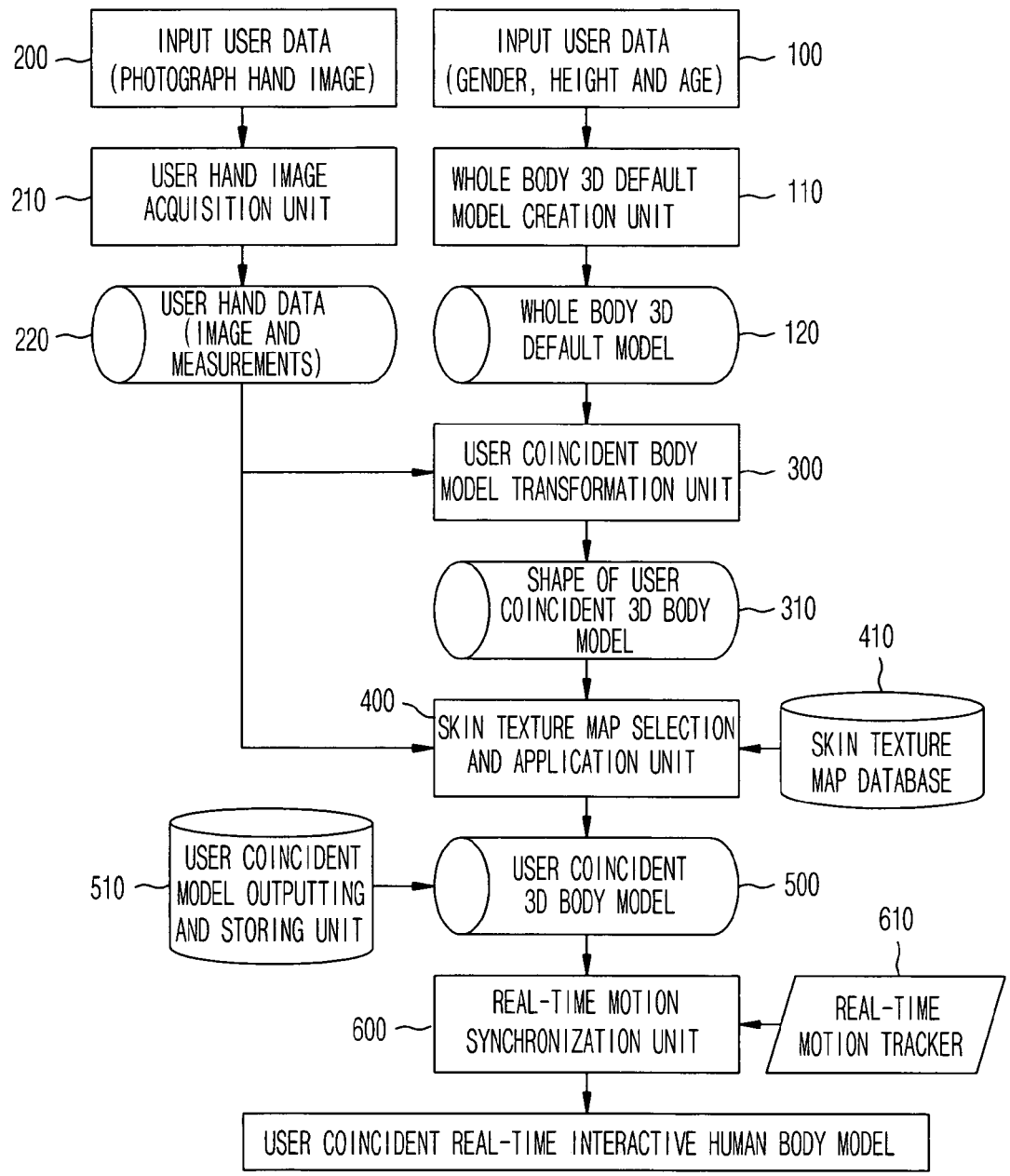
FIG. 1 illustrates a structure and flow of an entire system in accordance with an embodiment of the present invention

Reference will now be made in detail to the preferred embodiments of the present invention, examples of which are illustrated in the accompanying drawings.

Reference numerals given in the drawings indicate constituent elements or steps for creating and controlling a three-dimensional (3D) human body model. Particularly, the reference numerals given to the apparatus include steps for creating and controlling the 3D human body model.

A. Whole Body 3D Default Model Creation Unit

Figure 2:
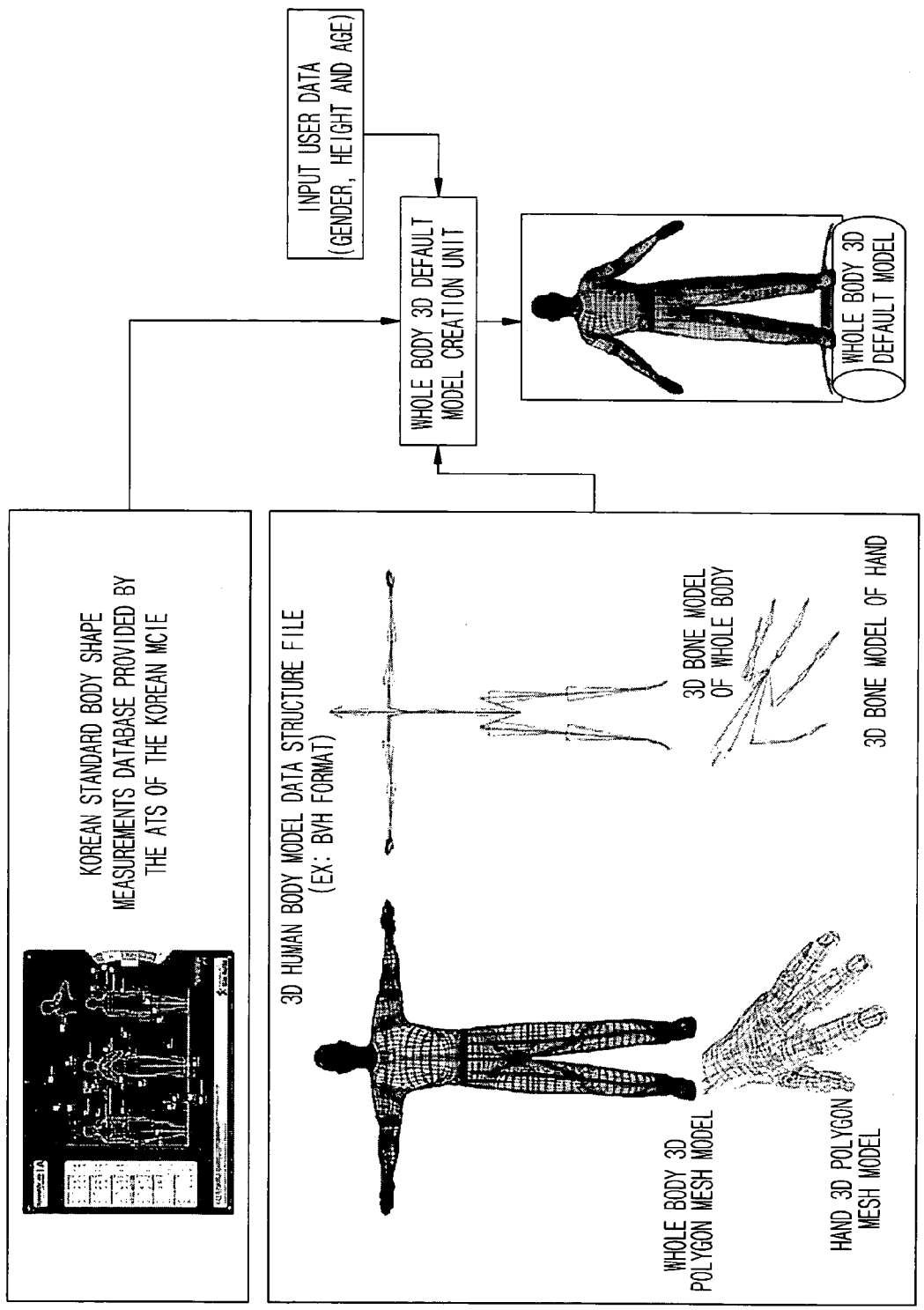
FIG. 2 presents a detailed view of a whole body three-dimensional (3D) default model creation unit in accordance with an embodiment of the present invention.

The technology of the present invention transforms and creates a whole body 3D default model for a user based on the gender and age of the target user and body measurement data of grouped users stored in a database. The present invention, which aims to create a virtual reality human body model with a high degree of coincidence with a user through a simple and quick process, generates a default 3D human body model and then transforms it to coincide with a user. As shown in the step 100, 110 and 120 of FIG. 1 and FIG. 2, a bone model defining the structure of a whole body and a polygon mesh model defining a shape are used as basic data. The gender and age of a model to be used are selected by the input of the user. In the step 110 of FIG. 1, the measurements of each part of the default model are scaled based on the measurement values of a standard body shape measurements database, which is shown in FIG. 2. The Korean standard body shape data are provided by the Agency for Technology and Standards (ATS), an affiliation organization of the Korean Ministry of Commerce, Industry and Energy (MCIE). Since the technology of defining and creating a 3D human body model, i.e., a 3D polygon mesh model with a skin texture map, in such a format as BVH, which is shown in FIG. 2, and scaling the measurements of the model is a well-known technology in the related field, e.g., 3D computer graphics, detailed description on it will not be provided herein.

B. User Hand Image Acquisition Unit

Figure 3:
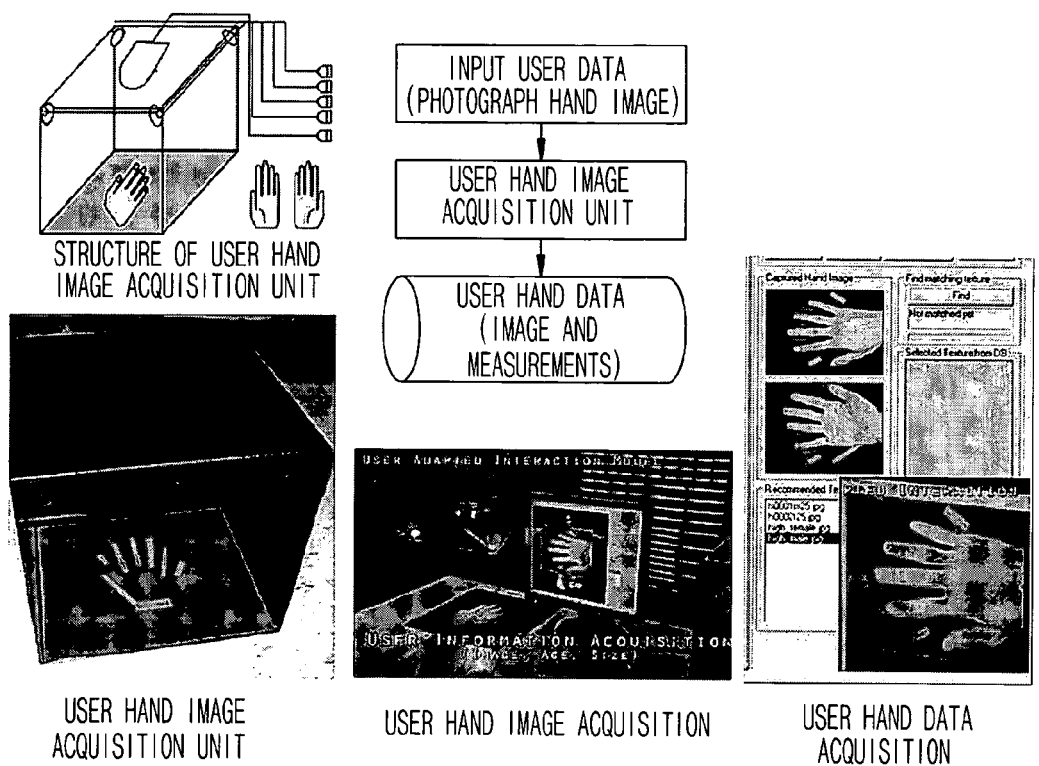
FIG. 3 shows a user hand image acquisition unit in accordance with an embodiment of the present invention.

Body measurement data and skin texture map data are acquired from the hands of the user by using an image acquiring device, which will be called a user hand image acquisition unit. FIG. 3 shows an example of steps 200, 210 and 220 of FIG. 1. The drawing shows a process of inputting image data, measurement data including hand length (Hand_Length) and hand breadth (Hand_Breadth) from the hands of the user. The user hand image acquiring unit includes an illuminator for maintaining a predetermined lighting condition as shown in the left part of FIG. 3, an image acquiring camera, such as a 1.10 million-pixel Universal Serial Bus (USB) camera, and a communication unit for communicating with a computer which operates an image data acquisition program and processes the data in such a method as a USB scheme. When the user inputs images of the back and palm of his hands, which are shown in the central lower part of FIG. 3, the hand images of the user, which are photographed as shown in the right part of FIG. 3, are acquired and stored. To clearly acquire the hand image of the user, the apparatus of the present invention processes the background in a predetermined color, such as blue, and separates and stores only the apricot-color skin data by using a color computation method, e.g., a chroma keying method. Also, as shown in the right lower part of FIG. 3, a distance from the wrist of the user to the tip of a central finger and a distance between the palms are acquired in an image processing method. For example, the maximum and minimum position values where the apricot color appears in the images are found and converted into length values. Since the image processing method described above is a well-known technology in its field, detailed description will not be provided herein.

C. User Coincident Body Model Transformation Unit

To enhance the degree of coincidence with the user, the measurements of detailed body parts of the default body module, which is generated in the previous steps, are re-scaled by using an algorithm predicting measurement values of major parts of a body based on the inputted hand measurement data of the user, which are also acquired in the previous step. The technology of the present invention provides a method for quickly and simply creating a 3D interactive model having a high coincidence degree with the user. Thus, a 3D scanning method and a professional human body modeling tools, such as Maya and 3DS MAX, which are used to produce a high-quality computer graphics result are rarely used due to the costs and the inappropriateness of time taken for obtaining a result. The model is created by putting importance on improving the coincident degree in the hands under the shoulders. This is because hands are part of the user's body that the user watches most frequently when the user manipulates a target object in the viewpoint of the first person in a virtual reality system. Bone length values of the default model obtained in the step 120 to be close to the body shape of the user are scaled in step 300 of FIG. 1 based on the hand length and the hand breadth, which are obtained in the step 220 of FIG. 2 and the description of FIG. 3, and an equation for regressing length values of the other body parts of the user. In the present embodiment of the invention, the regressed length values are applied to scaling the length of the bones under the shoulders. The equation shows a correlation between each length of a finger bar and another part of the user's body based on the measurement values of the human body measurement database. For example, the height of the user can be predicted by the length of the user's foot. An equation used in the present embodiment of the invention, which is an example of a prediction equation, is as follows:

$$Y = b0 + \text{Hand\_Length} * b1 + \text{Hand\_breadth} * b2$$

where Y denotes a length value of a target bone whose length is to be determined; and b0, b1 and b2 denote constants/weight values defined in an algorithm for generating the prediction equation.

The prediction equation is revealed in U.S. Army Natick research (Hand anthropometry of U.S. army personnel, U.S. army Natick research, development & engineering center Natick, Mass., December 1991).

D. Skin Texture Map Selection and Application Unit

Figure 4:
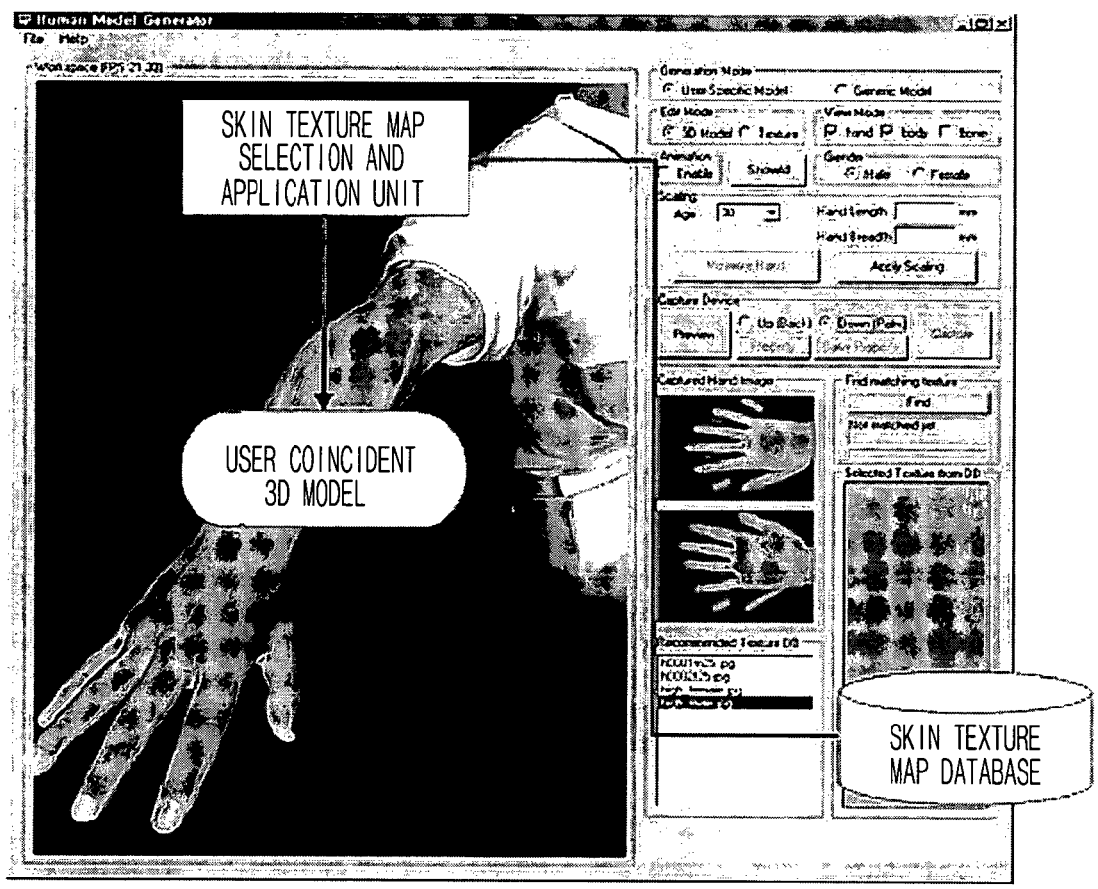
FIG. 4 describes a user coincident body model transformation unit in accordance with an embodiment of the present invention.

A skin texture image database and a skin texture map which coincides with the skin texture map of the current user are automatically or manually selected to increase the coincidence degree with the user and automatically reflect the skin texture to the 3D body model. When the body shape of the 3D model that coincides with the user is determined in the user coincident human body model transformation unit in step 310 of FIG. 1, a skin texture map with a high user coincidence degree is applied to the 3D body model. Generally, the user should work manually with a computer graphics tool for a long time to apply a skin texture map to the 3D body model. Since the present invention aims at quick creation of a human body model through a simple process, the present invention chooses to automatically select a skin texture map from a predetermined skin texture map database, which is shown in FIG. 4. A skin texture map with a high coincidence degree is searched for from the database by using a color data of the user's hand images, which are obtained in the process of FIG. 3, as a primary index and using the gender and age of the user as secondary indices. The skin texture map database is built up in advance according to the skin colors, ages and gender. As shown in FIG. 4, a skin texture map automatically searched by the system may be automatically applied to the body model or a user may select one skin texture map among selected candidates, if necessary. Since the methods of building the skin texture map data base and determining a skin texture map with a high coincidence degree based on color and other information from a plurality of 2D images are well-known in the field of image processing, detailed description on them will not be provided herein.

E. User Coincident Model Outputting and Storing Unit

A user-centric 3D interactive human body model created through the above-described processes is stored to be re-used or to be integrated with another system. The body model created through aforementioned process and the skin texture map are stored in the steps 500 and 510 in a predetermined data format to be used in a 3D computer graphics system of a similar purpose later. According to the method described in the present invention, the polygon mesh data for the body model are stored in the format of OBJ and the skin texture map data are stored in the format of JPG.

F. Real-time Motion Synchronization Unit

In a virtual reality system, user tracking data are linked and synchronized with a hardware interface for real-time interaction. Referring to steps 600 and 610 of FIG. 1, the motion of the user's hand and fingers, i.e., the angle of each finger bar, and the motion of the user's arms are connected with a tracker in 6 degrees of freedom (3-axis positioning values and 3-axis posture tilting values). The human body model suggested in the present invention includes a bone model for defining the structure of a human body and skin which is connected to the bone model and deformed. The joints of the bone model can deform the body shape by reflecting a value obtained from the real-time motion tracker of FIG. 5.

G. User Model Motion Controlling Unit

The motion of the user centric 3D body model created through the above-mentioned steps is controlled and naturally visualized in a deformable polygon mesh structure. General virtual reality systems using such an industrial virtual reality tool as Jack, Ramsis and Safework, cannot support the natural motion variation at joints of a human body. The 3D interactive body model, which is suggested in the present invention, solves the problem by using a real-time deformable polygon mesh technology. In short, when the 3D body model which represents the motion of the user is visualized in a virtual reality system, the joint parts tend to be visualized unnaturally because the motion is visualized by simply changing joint values of the rigid body model in most cases. In the present invention, however, the deformation of skin is visualized naturally according to the variation in the angle of the joints by applying the deformable polygon mesh technology to even fingers under the shoulders. This is processed between the steps 120 and 300 and in the step 600. Whenever a 3D body model is created or deformed substantially, the deformation is controlled in the deformable polygon mesh structure. Since this technology is well-known as skinning in the field of computer graphics, detailed description will not be provided herein. The skinning is revealed in "Skin them bones: Game Programming for the Web Generation," by Lander and Jeff, in *Game Developer Magazine*, May 1998, pp. 11-16.

EMBODIMENT

Figure 5:
FIG. 5 illustrates a real-time motion synchronization unit in accordance with an embodiment of the present invention.
Figure 5:
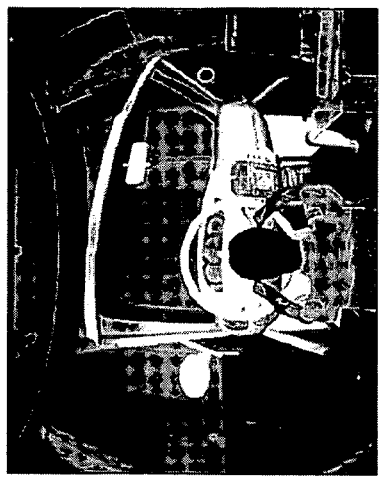
Figure 5:
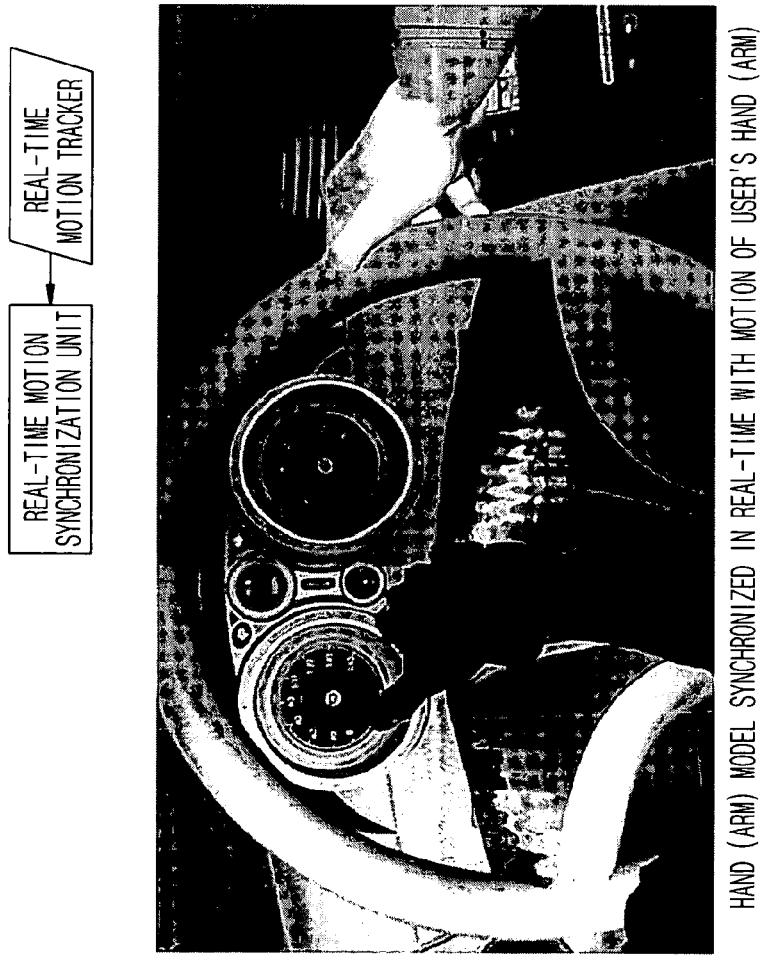

Referring to FIGS. 2 to 5, the present embodiment presents a system where a user enjoys and manipulates the interior design of a car in a virtual space. The user creates a virtual reality human body model having a high degree of coincidence with himself through a simple and quick process that the user inputs his gender, age and hand images. As shown in FIG. 5, the user directly controls the virtual reality body which is visualized and coinciding with the motion of the user to thereby enjoy and manipulates the interior of the virtual car model in his viewpoint just as it really happens to him.

As described above, the apparatus and method for immediately creating and controlling a virtual reality interactive human body model, which is suggested in the present invention, can make a user directly participate in a virtual reality system in a quick and simple manner and work naturally in the same interaction as reality. Therefore, the apparatus and method of the present invention can provide interactive contents where users can actively participate, create related markets, and contribute to popularization of technology.

The apparatus and method of the present invention can be applied to a user-centric real-time interactive system where users directly manipulate and check functions of a virtual product model in the stage of product planning and designing to evaluate the product. Also, the apparatus and method of the present invention can provide a system that can help users experience the design and functions of a product in the same method as they use it in reality, i.e., interaction, and make a purchase decision by building up a virtual environment of the product in a product exhibition when a product can be manufactured only after an order is placed for it or when there is no actual product sample. The apparatus and method can help a company to quickly and easily cope with a demand for the development of technology for applying feedback on product design and functions to a production stage to satisfy fast changing needs of consumers. Ordinary consumers can experience the design and functions in a product exhibition through the virtual reality system whether the design and functions are satisfactory. The apparatus and method of the present invention is also appropriate for the trend of product exhibition in which product evaluation is changing from the use of two-dimensional catalog to 3D video demonstration, and users can evaluate and manipulate the design of the product in stereoscopic video.

It will be apparent to those skilled in the art that various modifications and variations can be made in the present invention. Thus, it is intended that the present invention covers the modifications and variations of this invention provided they come within the scope of the appended claims and their equivalents.

What is claimed is:

1. An apparatus for immediately creating and controlling a virtual reality interactive human body model for a user-centric interface, comprising:
    a whole body three-dimensional (3D) default model creation unit for creating a whole body 3D default model based on gender and age of a user and a body measurements database;
    a user hand image acquisition unit for acquiring hand measurement data and skin color data from a hand image of the user which are acquired by an image acquisition device;
    a user coincident body model transformation unit for predicting measurements of body parts from the hand measurement data and scaling the whole body 3D default model to thereby produce a user coincident 3D body model;
    a skin texture map selection and application unit for applying a skin texture map to the user coincident 3D body model based on the skin color data of the user's hand; and
    a real-time motion synchronization unit for linking and synchronizing user tracking data with a hardware interface for real-time interaction.

2. The apparatus of claim 1, wherein the whole body 3D default model creation unit uses a bone model for defining a whole body structure and a polygon mesh model for defining a body shape as basic data.

3. The apparatus of claim 1, wherein the image acquisition unit includes:
    an illuminator for maintaining a lighting condition;
    a camera for photographing the hand; and
    a communication means for communicating with a computer which operates an image data acquisition program and processes data.

4. The apparatus of claim 1, wherein the user coincident body model transformation unit generates a user coincident body model by focusing on improving a coincident degree in the hands under the shoulders of the user.

5. The apparatus of claim 1, wherein the skin texture map selection and application unit includes a skin texture map database including a plurality of skin texture maps.

6. The apparatus of claim 1, further comprising a user coincident model outputting and storing unit for storing the shape polygon mesh data generated in the skin texture map selection and application unit in an OBJ format and storing a skin texture map in a JPG format.

7. The apparatus of claim 1, wherein the real-time motion synchronization unit is connected to a tracker for tracking the motion of the hand and arm of the user in 6 degrees of freedom including 3-axis positioning values and 3-axis posture tilting values.

8. A method for immediately creating and controlling a virtual reality interactive human body model for a user-centric interface, comprising the steps of:
    a) creating a whole body 3D default model based on gender and age of a user and a body measurements database and acquiring hand measurement data and skin color data from a hand image of the user which are acquired by an image acquisition device;
    b) predicting measurements of body parts from the inputted hand measurement data and scaling the whole body 3D default model to thereby produce a user coincident 3D body model;
    c) applying a skin texture map to the user coincident 3D body model based on the skin color data of the user's hand; and
    d) linking and synchronizing user tracking data with a hardware interface for real-time interaction.

9. The method of claim 8, wherein a bone model for defining a whole body structure and a polygon mesh model for defining a body shape are used as basic data in the step a).

10. The method of claim 8, wherein the skin color data are acquired in the step a) by using a color computation method including a chroma keying method based on a predetermined background color.

11. The method of claim 8, wherein the hand measurement data including a distance from a wrist of the user to the tip of a central finger and a distance between the palms are acquired in an image processing method which finds maximum and minimum position values where apricot color appears in the hand image of the user and converting the maximum and minimum position values into length values.

12. The method of claim 11, wherein the default body model is scaled by focusing on improving a coincident degree in the hands under the shoulders of the user based on an equation expressed as:

$$Y = b0 + \text{Hand\_Length} * b1 + \text{Hand\_breadth} * b2$$

where Y denotes a length value of a target bone whose length is to be determined; and b0, b1 and b2 denote constants/weight values defined in an algorithm for generating the prediction equation.

13. The method of claim 8, wherein a skin texture map with a high coincidence degree is searched for from the database by using a color data of the user's hand images as a primary index and using the gender and age of the user as secondary indices.

14. The method of claim 8, further comprising after the step c) a step of:
    e) storing the shape polygon mesh data generated in an OBJ format and storing a skin texture map in a JPG format.

15. The method of claim 8, wherein the body model is deformed by being linked with a tracker for tracking the motion of the hand and arm of the user in 6 degrees of freedom including 3-axis positioning values and 3-axis posture tilting values.

16. The method of claim 8, wherein the variation of a joint angle in each part of the created or transformed 3D body model and the deformation of skin caused by the variation in the joint angle are visualized by using a real-time deformable polygon mesh technology.

* * * * *